United States Patent
Laroia et al.

(10) Patent No.: US 8,477,683 B2
(45) Date of Patent: Jul. 2, 2013

(54) CONFIGURING A HOST DEVICE BY WAY OF MMP

(75) Inventors: Rajiv Laroia, Far Hills, NJ (US);
Prasanna Nadhamuni, Somerset, NJ (US); Rick Dynarski, Freehold, NJ (US); George Tsirtsis, New York, NY (US); Vincent D. Park, Budd Lake, NJ (US); M. Scott Corson, Gillette, NJ (US); Pablo Anigstein, Gillette, NJ (US); Prashanth Hande, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1499 days.

(21) Appl. No.: 11/487,291

(22) Filed: Jul. 14, 2006

(65) Prior Publication Data

US 2008/0316979 A1 Dec. 25, 2008

Related U.S. Application Data

(60) Provisional application No. 60/792,144, filed on Apr. 13, 2006.

(51) Int. Cl.
*H04W 4/00* (2009.01)
(52) U.S. Cl.
USPC ............ 370/328; 370/338; 370/392; 370/401
(58) Field of Classification Search
None
See application file for complete search history.

(56) References Cited

U.S. PATENT DOCUMENTS

| | | | |
|---|---|---|---|
| 6,760,444 B1 | 7/2004 | Leung | |
| 6,804,221 B1 * | 10/2004 | Magret et al. | 370/338 |
| 6,956,846 B2 | 10/2005 | Lewis et al. | |
| 7,016,328 B2 * | 3/2006 | Chari et al. | 370/331 |
| 7,072,340 B2 * | 7/2006 | Agrawal et al. | 370/392 |
| 7,184,418 B1 * | 2/2007 | Baba et al. | 370/331 |
| 7,548,523 B2 * | 6/2009 | Babbar et al. | 370/331 |
| 2003/0142642 A1 * | 7/2003 | Agrawal et al. | 370/328 |
| 2004/0203765 A1 * | 10/2004 | Das et al. | 455/435.1 |

(Continued)

FOREIGN PATENT DOCUMENTS

| | | |
|---|---|---|
| EP | 1139634 | 10/2001 |
| JP | 2003179616 A | 6/2003 |

(Continued)

OTHER PUBLICATIONS

Dutta (ED) Telcordia V Fajardo Y Ohba K Taniuchi Tari H Schulzrinne Columbia Univ A: "A Framework of Media-Independent Pre-Authentication (MPA); draft-ohba-mobopts-mpa-framework-02.txt" IETF Standard-Working-Draft, Internet Engineering Task Force, IETF, CH, No. 2, Mar. 5, 2006, XP015044480 ISSN: 0000-0004.

(Continued)

*Primary Examiner* — Bob Phunkulh
(74) *Attorney, Agent, or Firm* — Michelle Gallardo

(57) ABSTRACT

The claimed subject matter relates to configuring a host device through utilization of MMP, which is a protocol that is based upon MIP but not associated with several deficiencies associated therewith. In particular, a wireless terminal can be configured to run MMP and send messages that conform to MMP over a wireless link. A base station can be configured to act as a DHCP server. The base station can provide configuration information to host device by way of DHCP.

37 Claims, 14 Drawing Sheets

U.S. PATENT DOCUMENTS

| | | | |
|---|---|---|---|
| 2005/0102522 A1 | 5/2005 | Kanda | |
| 2005/0195773 A1* | 9/2005 | Popovich et al. | 370/338 |
| 2005/0213545 A1* | 9/2005 | Choyi et al. | 370/338 |
| 2006/0002324 A1* | 1/2006 | Babbar et al. | 370/325 |
| 2006/0146746 A1* | 7/2006 | Kim | 370/328 |
| 2008/0267186 A1* | 10/2008 | Boukis et al. | 370/392 |

FOREIGN PATENT DOCUMENTS

| | | |
|---|---|---|
| JP | 2005051436 A | 2/2005 |
| JP | 2006033674 A | 2/2006 |
| WO | 0189157 | 11/2001 |
| WO | WO2005029881 A2 | 3/2005 |
| WO | WO 2005/074307 * | 8/2005 |
| WO | WO2005125235 A2 | 12/2005 |
| WO | WO2006018045 A1 | 2/2006 |

OTHER PUBLICATIONS

International Search Report—PCT/US07/066505, International Search Authority—European Patent Office—Oct. 29, 2007.

Written Opinion—PCT/US07/066506, International Search Authority—European Patent Office—Oct. 29, 2007.

* cited by examiner

CONFIGURING A HOST DEVICE BY WAY OF MMP

CROSS REFERENCE TO RELATED APPLICATION

This application claims the benefit of U.S. Provisional Patent Application No. 60/792,144, entitled METHODS AND APPARATUS FOR EFFICIENT NETWORK ACCESS, and filed on Apr. 13, 2006. The entirety of this application is incorporated herein by reference.

BACKGROUND

I. Field

The following description relates generally to communications systems, and more particularly to configuring a host in a wireless communications system.

II. Background

Wireless networking systems have become a prevalent means to communicate with others worldwide. Wireless communication devices, such as cellular telephones, personal digital assistants, and the like have become smaller and more powerful in order to meet consumer needs and to improve portability and convenience. Consumers have become dependent upon these devices, demanding reliable service, expanded areas of coverage, additional services (e.g., web browsing capabilities), and continued reduction in size and cost of such devices.

A typical wireless communication network (e.g., employing frequency, time, and code division techniques) includes one or more base stations that provides coverage areas to subscribers as well as mobile (e.g., wireless) devices that can transmit and receive data within the coverage areas. A typical base station can simultaneously transmit multiple data streams to multiple devices for broadcast, multicast, and/or unicast services, wherein a data stream is a stream of data that can be of independent reception interest to a user device. A user device within the coverage area of that base station can be interested in receiving one, more than one or all the data streams carried by the composite stream. Likewise, a user device can transmit data to the base station or another user device.

To enable a wireless device to communicate within a wireless network, such device or a host associated therewith must be configured. In particular, in packet-switched networks, a host device (e.g., a mobile phone, a personal digital assistant, a laptop computer, . . . ) must be configured prior to enabling such device to utilize network services, wherein configuration can include receiving an appropriate IP address, for example. Conventionally, a host device is configured through communications made in accordance with the mobile IP protocol (MIP) between, for instance, a host device, an access node (e.g., base station), and a home agent. An over-the-air (OTA) link between the host device and the base station, however, may be constrained, and MIP can require transmission of a substantial amount of data over such link. Thus, a significant amount of resources associated with the OTA link may be utilized when a host is being configured, thereby reducing available resources with respect to other host devices in coverage area of an access node.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to configuring a host device through utilization of MMP, which is a protocol that is based upon MIP but not associated with several deficiencies associated therewith. In particular, a wireless terminal can be configured to run MMP and send messages that conform to MMP over a wireless link. A base station can be configured to act as a DHCP server. The base station can provide configuration information to host device by way of DHCP.

In accordance with an aspect, a method for configuring a host device is described herein, where the method comprises receiving a request with respect to registering a wireless terminal by way of MMP, providing an IP address to the wireless terminal by way of MMP, and configuring a host associated with the wireless terminal by way of DHCP. A wireless communications apparatus is also disclosed, where the apparatus can include a memory that retains instructions for receiving a request with respect to registering a wireless terminal by way of MMP, providing an IP address to the wireless terminal by way of MMP, and configuring a host associated with the wireless terminal by way of DHCP. The wireless communications apparatus can additionally include a processor that executes the instructions.

In accordance with another aspect, a communications apparatus, comprising is described below, wherein the apparatus comprises means for receiving a registration request from a wireless terminal by way of MMP, means for providing IP configuration information to the wireless terminal, wherein the configuration information is associated with a host device related to the wireless terminal, and means for configuring the host device by way of DHCP. Additionally, the claimed subject matter contemplates a machine-readable medium having stored thereon machine-executable instructions for receiving a registration request from a wireless terminal by way of MMP, providing IP configuration information to the wireless terminal, wherein the configuration information is associated with a host device related to the wireless terminal, and configuring the host device by way of DHCP.

With respect to yet another aspect, a processor can be provided that executes instructions for receiving a request with respect to registering a wireless terminal by way of MMP, providing an IP address to the wireless terminal by way of MMP, and configuring a host associated with the wireless terminal by way of DHCP.

Moreover, a method that facilitates configuring a host device is described below, wherein the method comprises creating a registration request that conforms to MMP, wherein the registration request is generated on behalf of a host device, and transmitting the registration request to a base station by way of a wireless link. The method can further include receiving a registration response that conforms to MMP, the registration response relates to configuring the host device.

Still further, a wireless communications apparatus is described, wherein the wireless communications apparatus comprises a memory that retains instructions for generating an MMP registration request message on behalf of a host device, providing the MMP registration request to a base station over a wireless link, and receiving an MMP registration response message from the base station, wherein the response message indicates that an IP address is available with respect to the host device. The wireless communications apparatus can also include a processor that executes the aforementioned instructions.

Also described below is a wireless communications apparatus, wherein the apparatus comprises means for creating a registration request that conforms to MMP, wherein the registration request is generated on behalf of a host device. The apparatus further comprises means for transmitting the registration request to a base station by way of a wireless link, and means for receiving a registration response that conforms to MMP, the registration response relates to configuring the host device. A machine-readable medium is also disclosed herein, wherein such medium comprises instructions for generating an MMP registration request message on behalf of a host device, providing the MMP registration request to a base station over a wireless link, and receiving an MMP registration response message from the base station, the response message indicates that an IP address is available with respect to the host device.

In accordance with still another aspect, a processor is disclosed that is configured to execute instructions for generating a registration request with respect to a device that hosts the processor, wherein the registration request conforms to MMP, transmitting the registration request to a base station, and receiving a registration response message from the base station, wherein the registration response message indicates to the processor that an IP address has been assigned to the device that hosts the processor.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Figure 1:
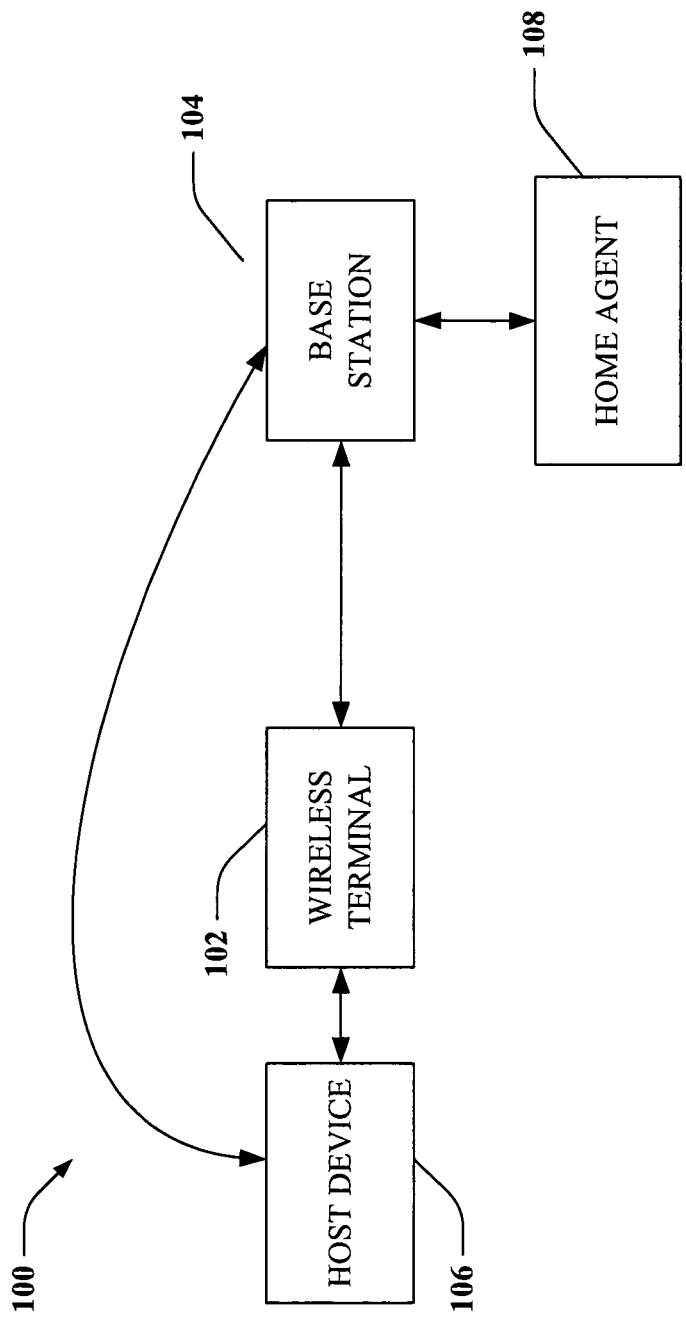
FIG. 1 is a high level block diagram of a system that is provided to illustrate configuration of a host by way of MMP.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

Furthermore, various aspects are described herein in connection with a terminal. A terminal can also be called a system, a user device, a secure digital card (SD card), a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Referring now to FIG. 1, a system 100 that is provided to illustrate configuration of a host device through utilization of a Mobility Management Protocol (MMP), which, for instance, can be a "scaled down" protocol that is based at least in part upon Mobile IP (a protocol commonly utilized to transmit configuration data between a host, a base station, and other network infrastructure devices). Several example data structures are provided and described herein that may be, but are not required to be, utilized in connection with MMP. Rather, such data structures are shown solely to illustrate one or more examples, and it is to be appreciated that other data structures that are based at least in part upon MIP are contemplated by the inventors and intended to fall under the scope of the hereto-appended claims.

System 100 includes a wireless terminal 102, which can be, for example, an integrated chip within a mobile handset, a secure digital (SD) card, a device that is physically coupled to a computer (e.g., laptop, desktop, . . . ), such as a card that can be inserted into a PCMCIA slot, or any other suitable device that can aid in wireless communications. Wireless terminal 102 can be tasked to establish a wireless link with a base station 104, thereby enabling data to be transferred between wireless terminal 102 and base station and/or a host device 106 and base station 104. Host device 106 can be a device that hosts wireless terminal 102, such as a personal digital assistant, a mobile telephone, a computer, or any other suitable host device. Host 106 can include, for example, an IP stack, enabling host 106 to run applications over IP.

Base station 104 is communicatively coupled to home agent 108, which can be employed in connection with mobility management. In other words, home agent 108 allows host 106 and terminal 102 to change geographic location within a wireless network without losing an ability to receive and transmit data. Wireless terminal 102 and base station 104 can undertake messaging to establish a physical layer connection therebetween, and authentication and authorization can also be undertaken to discern what services a subscriber is authorized to access. In accordance with authorization and authentication, a connect response message can be provided from base station 104 to wireless terminal 102, wherein such message can include data that can be utilized to identify base station 104 on the network.

Wireless terminal 102 can then provide a message, for instance, that accords to MMP, wherein such message indicates that an initial registration of an IP address is desired. As stated above, utilizing MMP reduces an amount of data that is transmitted over an OTA link, which typically is a link that is associated with constrained resources. Upon receiving the initial registration message, base station 104 can request an initial IP address and other suitable configuration information from home agent 108, wherein such request can conform to MIP, for example (e.g., Mobile IPv4 and/or Mobile IPv6). It is understood that MIP may be associated with various versions, such as MIPv4 and MIPv6, and aspects described herein can be employed in connection with any such version. Home agent 108 can then provide a response that includes a home address to base station 104, wherein the home address can be an IP address that is to be assigned to host device 106.

Wireless terminal 102 can thereafter inform host device 106 that a link is prepared over a wireless terminal interface (WTI), but host device 106 can be unaware that an IP address has been assigned by home agent 108. Host device 106 can be triggered to run the Dynamic Host Configuration Protocol (DHCP) and generate a DHCP discover message and relay it over the link. Base station 104 can be configured operate as a DHCP server, and can respond to such request to host device 106 (again by way of DHCP). Host device 106 can thereafter provide a request for an IP address to base station 104, and base station 104 can provide host device 106 with the requested IP address and other suitable configuration information.

In another embodiment, instead of wireless terminal configured to send/receive messages in MMP, host device 106 can be configured to transmit, receive, and interpret messages that conform to such a protocol. In such an example, host device 106 would provide the registration request in MMP by way of wireless terminal 102, and host device 106 would receive the home address and, if desired, other configuration information by way of MMP. In still another example, wireless terminal 102 can be configured to act as a DHCP server (rather than base station 104). Thus, for instance, when host device 106 creates a DHCP discover message it can be received by wireless terminal 102, which acts as the DHCP server and configures host device 106. In more detail, as described above, wireless terminal 102 can be configured to run MMP, and can receive an IP address (and possibly other configuration information) from base station 104 by way of a MMP message. Wireless terminal 102 can then indicate to host device 106 that a link is ready, and host device 106 can create a DHCP discover message. Wireless terminal 102 can act as the DHCP server and inform host device 106 that it is acting as such. Host device 106 can thereafter request an IP address and other suitable configuration information from wireless terminal 102, and wireless terminal can provide such information to host device 106.

Referring collectively to FIGS. 2-7, example data structures that can accord with MMP are described. It is to be understood, however, that such data structures are merely provided to illustrate examples of particular manners in which a protocol can be based upon MIP without large amounts of data typically associated with MIP, and that other data structures that may utilize syntax and/or partial data structures associated with MIP can be employed. The heretoappended claims are intended to encompass all such variations. Additionally, portions of messages or data structures are shown and described as being of various sizes. It is again understood that such sizes can change depending upon context, system state, and the like. In an example, a base station (and other network devices) may be configured to send and/or receive messages that conform to MMP and MIP. For instance, a base station can generate an MIP message based at least in part upon contents of an MMP message and can generate an MMP message based at least in part upon contents of an MIP message. MMP can be desirably run on OTA links, as such links are typically associated with a significant amount of resource constraint when compared to other links/tunnels within a network. MIP can be run between network infrastructure devices, such as between a base station and a home agent.

Figure 2:
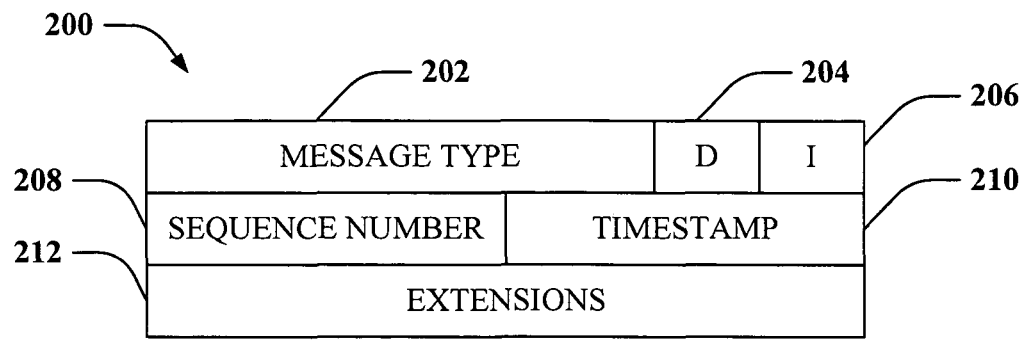
FIGS. 2-7 are example message formats that conform to MMP.

Turning specifically to FIG. 2, a message 200 that can be employed in connection with registering a link as a downlink network point of attachment for a wireless terminal is illustrated, which can be referred to as an L3 Registration Request Message. Such a message can be provided from wireless terminal 102 to base station 104 (FIG. 1), for example. Message 200 includes a message type field 202 (e.g., L3), which indicates a type of MMP message. Field 202 can be one byte in length, for instance. Message 200 also includes a field 204 that indicates whether message 200 is provided in connection with registering the link or de-registering the link. For example, the field can be one bit in size, where a first value (e.g., 1) indicates that message 200 is a link de-registration request while a second value (e.g., 0) indicates that message 200 is a link registration request.

Message 200 can additionally include a field 206 that further describes field 204. In more detail, if field 204 indicates that message 200 is a link registration request, field 206 can indicate whether or not the registration is an initial registration. Again, for example, field 206 can be one bit in length, where a first value indicates that message 200 relates to an initial registration and a second value indicates that message is not an initial registration. If field 204 is populated such that message 200 is a deregistration request, field 206 can be ignored. Message 200 can further include a field 208 that can be employed in connection with matching link registration requests with link registration responses. For example, field 208 can be initiated to zero upon powering on a mobile terminal and can be incremented for each registration request generated by the wireless terminal. In an example, if field 208 is associated with a rollover, field 208 can be rolled over to a non-zero value. Field 208 can be two bytes in size, for instance.

Message 200 additionally includes a field 210 that can associate a timestamp with message 200, wherein such field 210 can include time values that are based upon any suitable time source (e.g., NTP). In an example, field 210 can be four bytes in size. Message 200 also can include a field 212 for MMP extensions, wherein examples of such extensions are described in greater detail below. Size of such field 212 can vary with size of an extension. If such message 200 is provided over a packet-switched network, such as FLASH OFDM, message 200 can also include a field (not shown) that is utilized as a header for an LLC frame, which, for instance, can be one byte in size. In an example, receipt of message 200 at a base station can trigger an MIP registration request message from a base station to a home agent.

Figure 3:
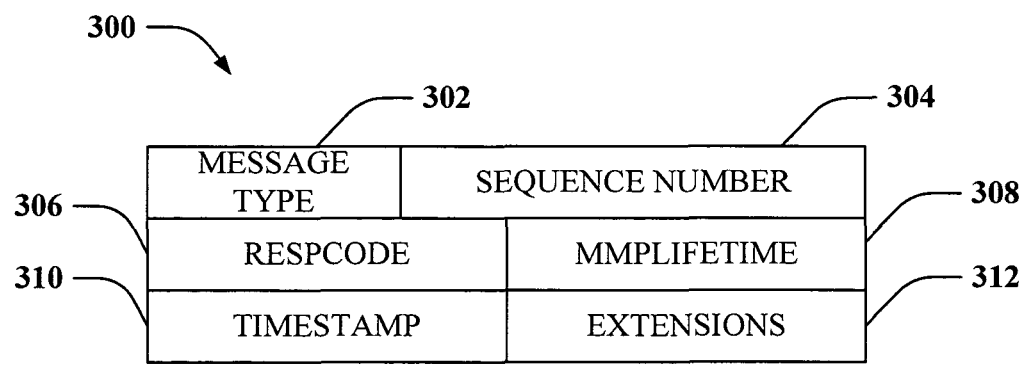

Now turning to FIG. 3, a message 300 that can be provided in response to a link registration request is illustrated. Message 300 can conform to MMP and be generated by a base station and delivered to a wireless terminal. Message 300 can include a message type field 302, which can identify that message 300 is a link registration response message. Field 302 can be one byte in length. Message 300 can also include a sequence number field 304, wherein contents of field 304 can mirror contents of field 304 in message 200 (FIG. 2). More particularly, contents of field 204 can be copied and placed into field 304, thereby enabling a wireless terminal to determine that message 300 corresponds to a previously delivered message.

Message 300 also includes a field 306 that includes one of several response codes. Examples of such codes include codes for indicating that the registration request has been accepted, that a previously assigned IP address is invalid, that an unknown error has occurred, that a simpler form of registration should be attempted, that there are currently insufficient resources (and registration should be attempted at a later time), that wireless terminal should generate a key and then re-attempt registration, that registration has timed out, that a timestamp error has occurred, etc. Field 306 can be one byte in length, for instance, enabling various codes to be placed in message 300.

A field 308 can also be included within message 300, wherein field 308 can include data that is indicative of an amount of time before a requested link registration expires (e.g., in seconds). In an example, field 308 can be two bytes in size. A timestamp field 310 can optionally be included within message 300 to correct an incorrect time indicated within message 200 (FIG. 2). Such field 310 can be of a substantially similar size as timestamp field 212 illustrated in FIG. 2. Message 300 can also include a field 312 that includes MMP extensions, which are described in greater detail herein. In an example, message 300 can be generated by a base station upon receipt of an MIP formatted message from a home agent.

Figure 4:
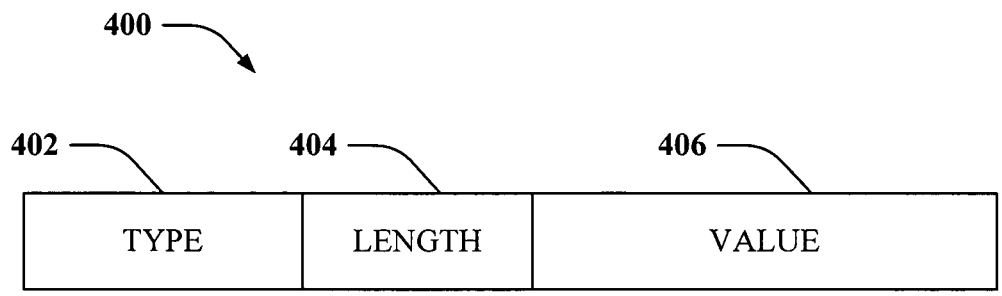

Referring now to FIG. 4, an example message format 400 that can be utilized in connection with transmitting MMP extensions is shown. Format 400 can support type-length-value extensions. A type field 402 describes a type of extension, which can indicate that a message includes an IP address, router information, a last interface with respect to which a wireless terminal performed a registration, and/or authentication information. For instance, field 402 can be one byte in length. A length field 404 describes a length of a message (e.g., in bytes), and can also be one byte in length, for example. Message format 400 can also include a value field 406, which can include an IP address, a value defined in a router information message (as defined below), and/or a value defined in an integrity message (as defined below). Value field 406 may be variable in length depending upon content of the message.

Figure 5:
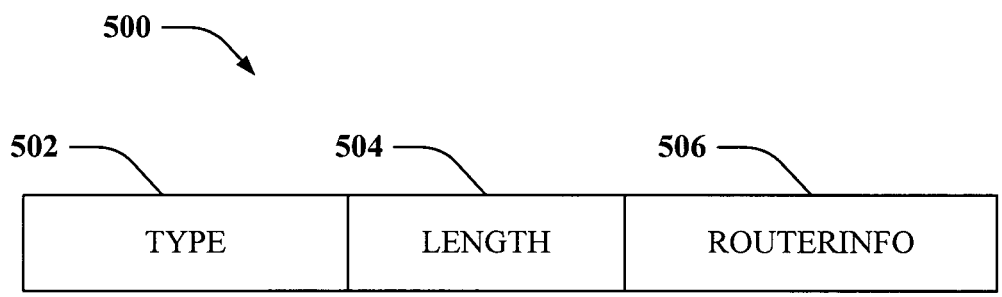

With reference to FIG. 5, a router information message 500 that can be employed in connection with an MMP protocol is illustrated. Message 500 can include a type field 502, which can include an indication of a type of extension, such as a message relating to routing and/or a last interface with respect to which a wireless terminal performed a registration. Field 502 can be one byte in length, for example. Message 500 can additionally include a length field 504, which can be one byte in size, and can indicate a length of message 500. A routerinfo field 506 can be a copy of a value found in a related field from a last or target base station within a configuration message. Field 506 can be of variable length, for example.

Figure 6:
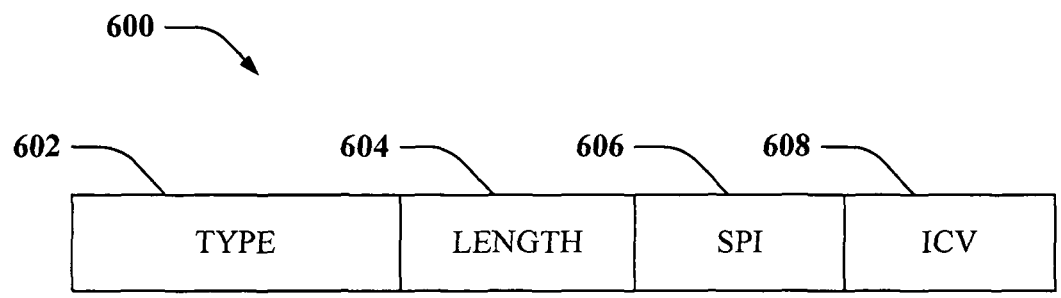

Turning now to FIG. 6, an example integrity message 600 is illustrated, wherein such message can conform to MMP. Message 600 includes a type field 602, which indicates that message 600 is of a particular type (e.g., a type described above with respect to FIG. 4). Message 600 can also include a length field 604 that can be descriptive of a size of message 600, wherein length field 604 can be one byte in size. Message 600 can further include an SPI field 606, which can be indicative of a particular algorithm that can be employed in connection with checking integrity. An ICV field 608 can include an integrity check value for an entire message, computing in any suitable manner. The integrity check value can be truncated to fit within a particular size, such as eight bytes.

Figure 7:
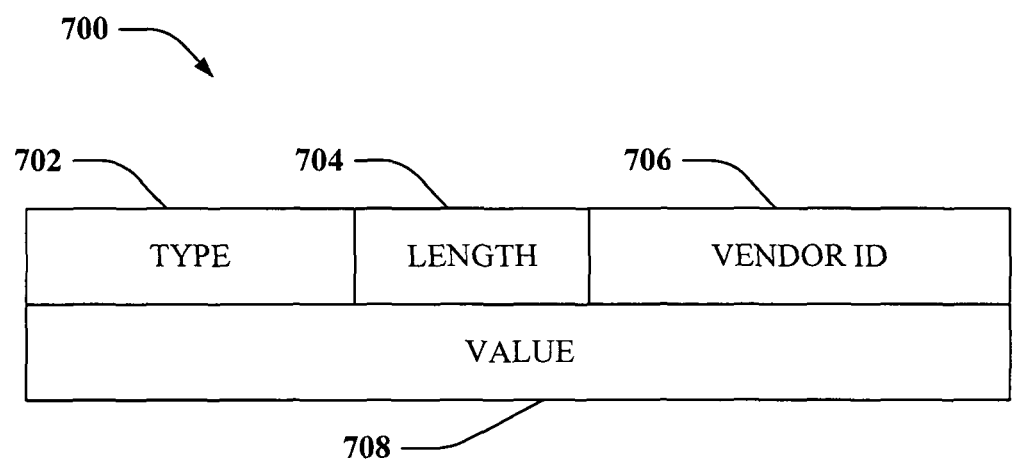

With reference now to FIG. 7, an example MMP envelope message 700 is displayed, which can be a vendor specific MMP object. Message 700 can include a type field 702 that indicates that message 700 is a vendor specific MMP object (which can be one byte in length). A length field 704 can describe a length of message 700, and a vendor ID field 706 can include data that identifies a particular vendor. A value field 708 can include a body of message 700, and can be variable in length. The messages and message formats described herein are provided to illustrate possible message/formats that can accord to MMP (a protocol that is based upon MIP but does not require an amount of data to be transmitted over an OTA link when compared to MIP).

Figure 8:
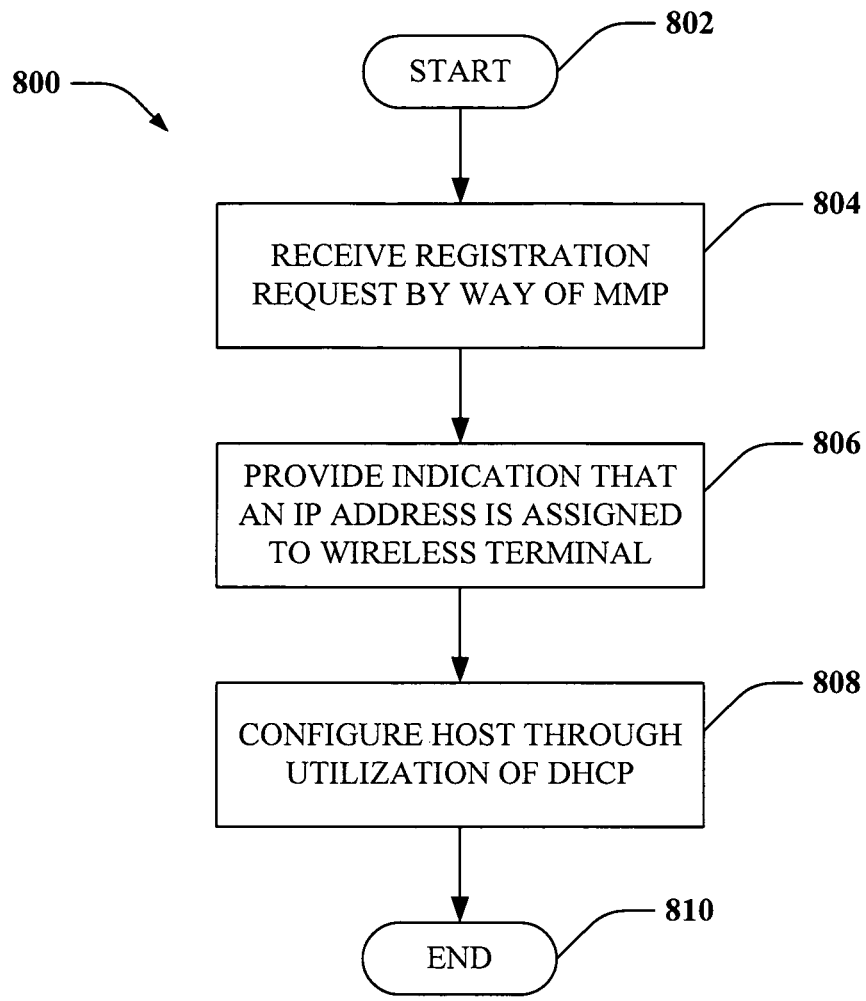
FIG. 8 is a representative flow diagram illustrating a methodology for configuring a host device through utilization of DHCP.
Figure 9:
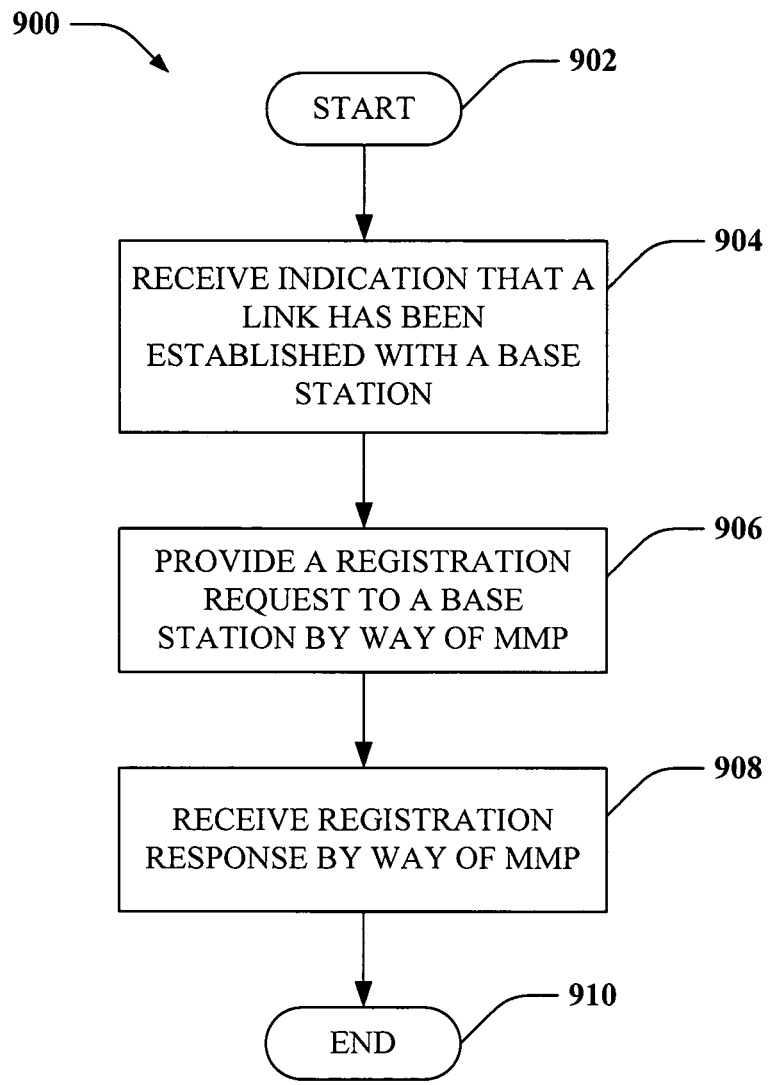
FIG. 9 is a representative flow diagram illustrating a methodology for transmitting registration information between a wireless terminal and a base station by way of MMP
Figure 11:
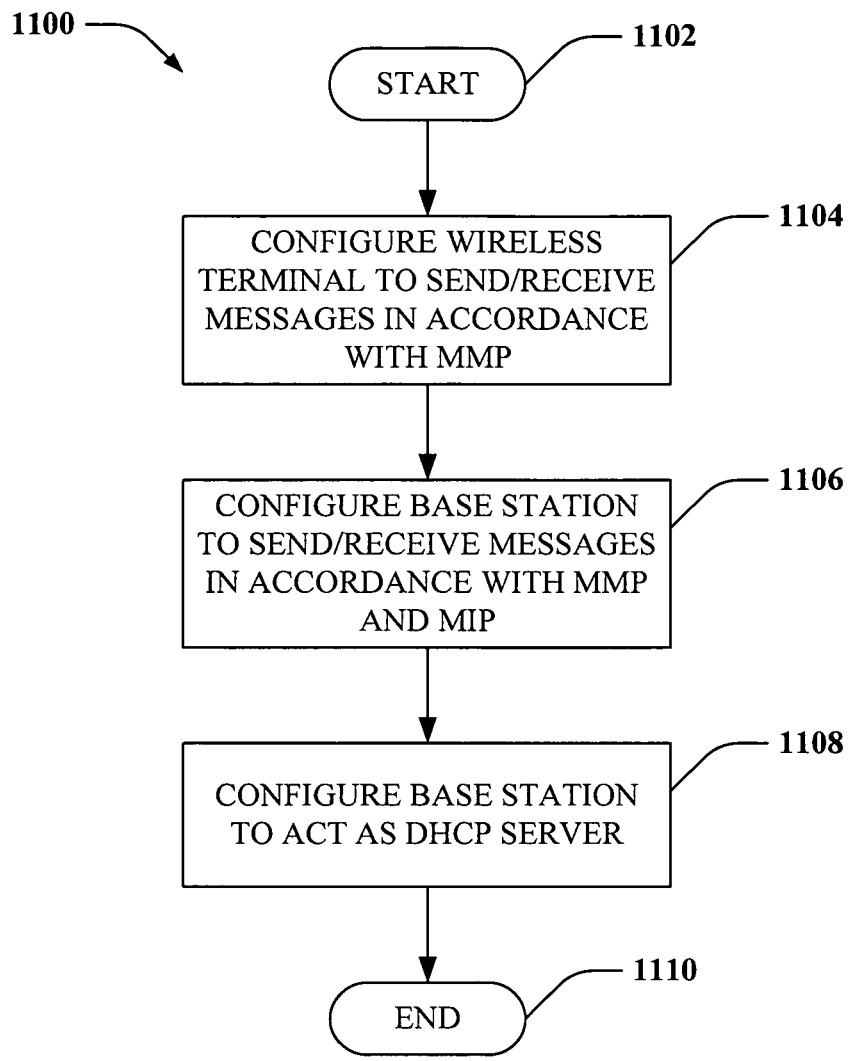
FIG. 11 is a representative flow diagram illustrating a methodology for configuring a base station to act as a DHCP server.

Referring to FIGS. 8, 9, and 11, methodologies relating to configuring a wireless terminal and/or a host are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Referring specifically to FIG. 8, a methodology 800 that facilitates configuring a host is illustrated. Methodology 800 starts at 802, and at 804 a registration request is received by way of MMP. For example, the registration request can be similar to message 200 described above with respect to FIG. 2. Additionally, the registration request can be received from a wireless terminal over an OTA link with such terminal. At 806, an indication that an IP address has been assigned to a host provided (e.g., indicated within field 306 of response message 300 (FIG. 3)) by way of MMP. Such an indication within a response message can be provided to the wireless terminal, for example. In another example, if the wireless terminal is configured to act as a DHCP server, an IP address can be received at 806. At 808, a host associated with the wireless terminal is configured through utilization of DHCP. Pursuant to an example, a base station can act as a DHCP server, and can provide the host with configuration information upon a request from the host for such configuration information. In more detail, a host can generate a DHCP broadcast message, and base station can respond to such message indicating that it is to act as a DHCP server for the host. The host can thereafter request IP configuration information from the base station, and base station can provide such configuration information to the host by way of DHCP. The host (and wireless terminal) can utilize the IP address to effectuate transmittal and receipt of data by way of a packet-switched network. Methodology 800 completes at 810.

Turning now to FIG. 9, a methodology 900 that can be utilized in connection with configuring a host is illustrated. Methodology 900 initiates at 902, and at 904 an indication is received that a wireless link has been established with a base station, wherein the indication can be received at a wireless terminal, for example. Such indication can include information that enables wireless terminal to maintain the wireless link as well as any other suitable link configuration information. At 906, a registration request is provided to a base station by way of MMP, wherein the registration request can be of a format similar to the format described with respect to registration request message 200 (FIG. 2). Such message can be provided by a wireless terminal, for instance. In another example, a host device can generate the registration request message and provide it to base station (e.g., by way of a wireless terminal). At 908, a registration response is received by way of MMP, wherein the response can be formatted in a manner that is substantially similar to that described with respect to message 300 of FIG. 3. The registration response can be generated at a base station and received at a wireless terminal and/or a host. The methodology 900 then completes at 910.

Figure 10:
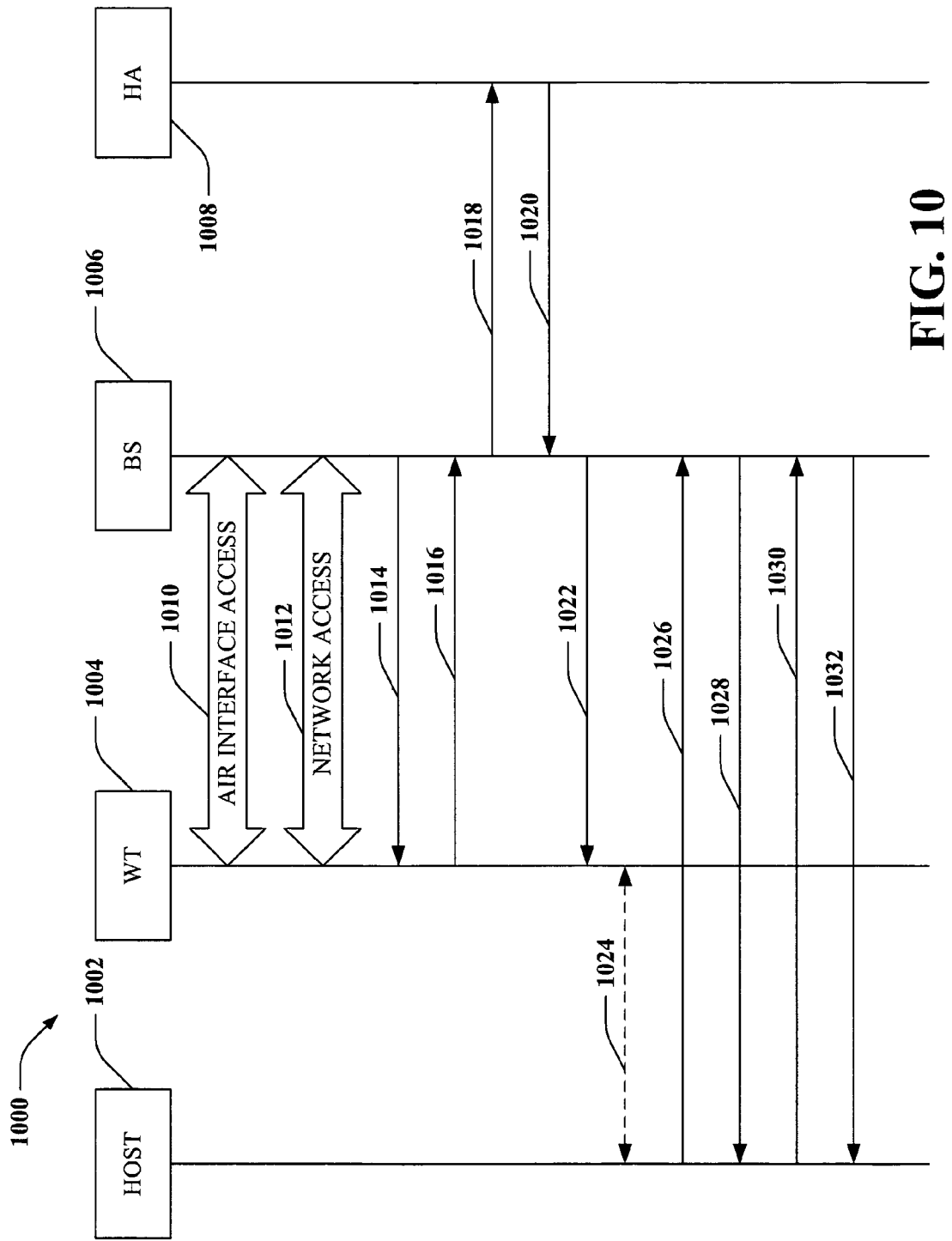
FIG. 10 is a diagram that illustrates configuration of a host device.

With reference to FIG. 10, a configuration diagram 1000 is illustrated. Diagram 1000 relates to a host 1002, a wireless terminal 1004, a base station 1006, and a home agent 1008. Host 1002 can be a computer or a portable device, and can include an IP stack. Wireless terminal 1004 can be utilized to handle physical layer connections and communications with a network (e.g., establish wireless communications with base station 1006). Base station 1006 acts as an access point to network services, and home agent 1008 can be utilized in connection with mobility management.

First, wireless terminal 1004 and base station 1006 can undertake an air interface access at 1010, wherein such act 1010 relates to establishing a physical layer connection between wireless terminal 1004 and base station 1006. A network access 1012 process is undertaken between wireless terminal 1004 and base station 1006, wherein network access process 1012 relates to authentication, authorization, and/or accounting. At 1014, a connect response message is provided from base station 1006 to wireless terminal 1004, wherein such message can be employed in connection with configuring wireless terminal 1004. For instance, the connect response message can include information that identifies base station 1006 at a network layer (e.g., a unique identifier at the network layer). In an example, the information can be or include an IP address associated with base station 1006.

Wireless terminal 1004 can thereafter provide a registration request message to base station 1006 at 1016, wherein the registration request message conforms to MMP. The act at 1016 establishes a link as a primary link between wireless terminal 1004 and base station 1006 (if multiple links are enabled). In this example configuration diagram 1000, MMP can run in wireless terminal 1004 and base station 1006. It is understood, however, that host 1002 and/or home agent 1008 can be configured to run MMP. In an example, the registration request message can be of a format that is substantially similar to that described with respect to FIG. 2. Base station 1006 is configured to receive the registration request message and analyze a profile associated with the wireless terminal 1004 (or subscriber associated therewith). The profile can be received, for instance, during network access 1012. Contents of the profile can be indicative of whether wireless terminal 1004 is statically or dynamically addressed. At 1018, base station 1006 can form and relay a MIP registration request message to home agent 1008. If multiple home agents exist within a network, base station 1006 can identify an appropriate home agent by analyzing the profile referenced above. Additionally, if an initial registration, an indication can be provided at 1018 that there is no IP address assigned to wireless terminal 1004 (e.g., by setting a flag or including a particular value within the request).

The MIP message formed at 1018 can be created in response to the MMP message received at the base station at 1016. The generated MIP message can include various flags, such as an S flag (simultaneous bindings), a B flag (broadcast datagrams), a D flag (decapsulation by mobile node), an M flag (minimal encapsulation), a G flag (GRE encapsulation), and a T flag (reverse tunneling). Such flags can be set to certain values according to system design and implementation. For instance, each flag except the T flag can be set to one. Moreover, the MIP message can include a lifetime field that can be set to a particular parameter by the base station. For instance, a value within the lifetime field of the MIP message can be dependent upon a value in a field of the received MMP message (e.g., field 204 as shown in FIG. 2). For example, a lifetime field within the MIP message at 1018 can be configured to perform deregistration if the MMP message received at 1016 indicates that the request is a deregistration request. The MIP message can also include a home address field, a home agent address field, a care of address field, an identification field, and extensions. Pursuant to an example, the identification field can be utilized in connection with matching an MIP registration request message with an MIP registration response message and additionally used for protecting against replay attacks of registration messages.

The identification field within the MIP registration request message provided by base station 1006 at 1018 can include a timestamp field, wherein contents of such field can be copied from a corresponding timestamp field (e.g., four bytes in size) within a MMP registration request message received by base station 1006 at 1016. In more detail, an MMP registration request message can include a timestamp field, such as field 212 illustrated in FIG. 2. Contents of such field can be copied to a lifetime field within the MIP message formed by base station 1016 at 1018. The MIP identification field can additionally include a sequence number field (e.g., two bytes) that can be copied from a corresponding sequence number field within an MMP registration request message (e.g., field 210 as shown in FIG. 2). The MIP identification field can further include a base station sequence number that can be incremented at discretion of base station 1016.

At 1020 home agent 1008 can respond to base station 1006 with an appropriate reply in MIP (a MIP registration response message), for example. Such reply can include an IP address that is desirably assigned to host 1002, an address of home agent 1008, and/or an amount of time that the registration will be effective prior to expiring. Upon receiving the MIP registration response message, base station 1006 can form an MMP registration response message and provide such message to wireless terminal 1004. The registration response message sent to wireless terminal 1004 can be substantially similar to registration response message 300 described in FIG. 3. Such a message can include a lifetime field that corresponds to the amount of time within the MIP registration response message. For instance, the lifetime field can include a time that is equal to or less than the time indicated within the MIP registration response message. Additionally, the MMP registration response message can include a timestamp if there is an error indicated within the MIP registration response message.

Upon receipt of the MMP registration response message, wireless terminal 1004 can have established its link with base station 1006 as a primary link. As this may be a first time that wireless terminal 1004 has established a primary link, wireless terminal 1004 can indicate to host 1002 over a wireless terminal interface that the network is available at 1024. Such trigger can initiate an autoconfiguration process in host 1002, wherein the configuration is valid until wireless terminal 1004 indicates that the network is down over the wireless terminal interface. Typically, host 1002 need only be notified once that a primary link has been established. In parallel, base station 1006 can be aware that the link with wireless terminal 1004 is the primary link with respect to wireless terminal 1004.

At 1026, host 1002 can generate a DHCP discover message, which can be delivered to wireless terminal 1004 and/or base station 1006. If the DHCP discover message is received by base station 1006, base station 1006 can respond with an appropriate DHCP offer message to host 1002 at 1028. Such message can include various parameters (depending upon parameters within the DHCP Discover message). For instance, the DHCP offer message can include an IP address, a lease time, a gateway address for the assigned IP address, a network mast for the IP address assigned, and the like. At 1030, host 1002 can respond with a DHCP request message, and at 1032 base station 1006 can in turn respond with an acknowledgement message. In other words, base station 1006 can be configured as a DHCP server. Host 1002 is thus network layer connected and configured.

In another example, wireless terminal 1004 can be configured as a DHCP server. For instance, the DHCP discover message can be received by wireless terminal 1004, which can have knowledge of configuration information associated with host 1002. Wireless terminal 1004 can thereafter form and provide host 1002 with the DHCP offer message, and can receive a response of host 1002 (e.g., in the form of a DHCP request message). Wireless terminal 1004 can thereafter provide host 1002 with a DHCP acknowledgement. Additionally, host 1002 can be configured to run MMP, such that (rather than wireless terminal 1004) host 1002 can generate and receive MMP messages. If host 1002 is configured in such a manner, it may not be necessary to configure wireless terminal 1004 or base station 1006 as a DHCP server, as host 1002 can be configured directly over MMP.

With reference now to FIG. 11, a methodology 1100 for configuring a wireless terminal and a base station to effectuation assignment of an IP address to a host device is illustrated. Methodology 1100 begins at 1102, and at 1104 wireless terminal is configured to send/receive messages in accordance with MMP. For example, memory associated with a wireless terminal can be populated with instructions for sending/receiving messages that conform to MMP, and a processor can be associated with wireless terminal to undertake such instructions. At 1106, base station can be configured to send/receive messages in accordance with MMP and MIP. For instance, the configuration can include populating a memory with instructions for sending/receiving messages that conform to MMP and sending/receiving messages that conform to MIP, and a processor can be utilized to execute the instructions. Additionally, the memory can include instructions for generating MMP and/or MIP messages with content that is based upon content within \MIP and/or MMP messages, respectively. At 1108, the base station is configured to act as a DHCP server. For example, memory associated with the base station can include instructions and/or data that enables base station to send and receive messages that conform to DHCP. The methodology 1100 then completes at 1110.

Figure 12:
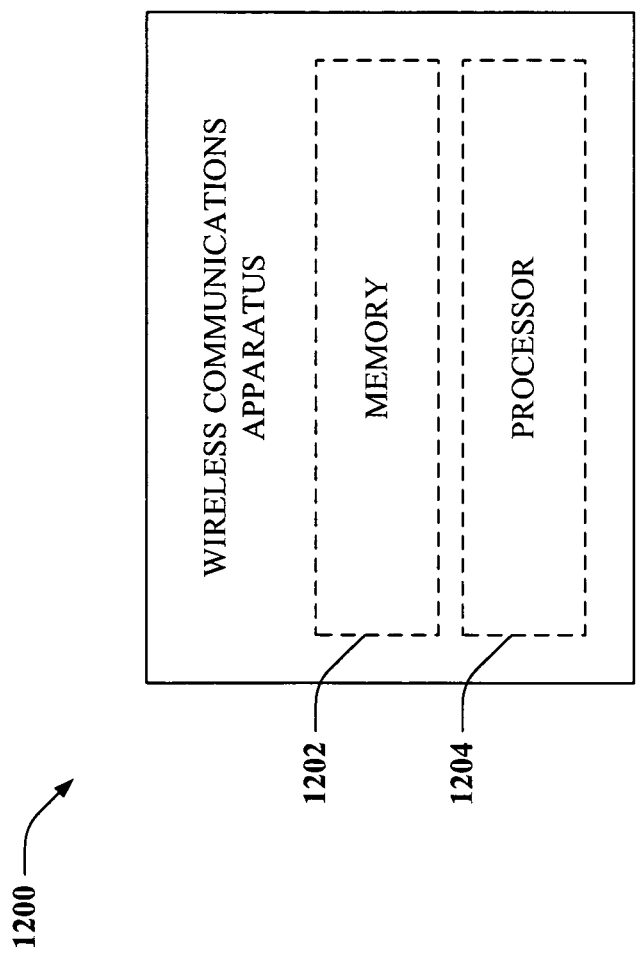
FIG. 12 is an example wireless communications apparatus.

Now turning to FIG. 12, a wireless communications apparatus 1200 is illustrated. Wireless communications apparatus can be, for example, a host, a wireless terminal, a base station, and/or a home agent. Apparatus 1200 can include a memory 1202, which can include instructions that relate to, for example, sending and receiving messages that conform to MMP. Moreover, memory 1202 can include instructions for enabling wireless communications apparatus 1200 to act as a DHCP server. Additionally, memory 1202 can include instructions for sending/receiving data that conforms to MIP, reviewing MIP messages and withdrawing content therefrom and placing such content within an MMP message, etc. Apparatus 1200 can also include a processor 1204 that can execute instructions retained within memory 1202.

Figure 13:
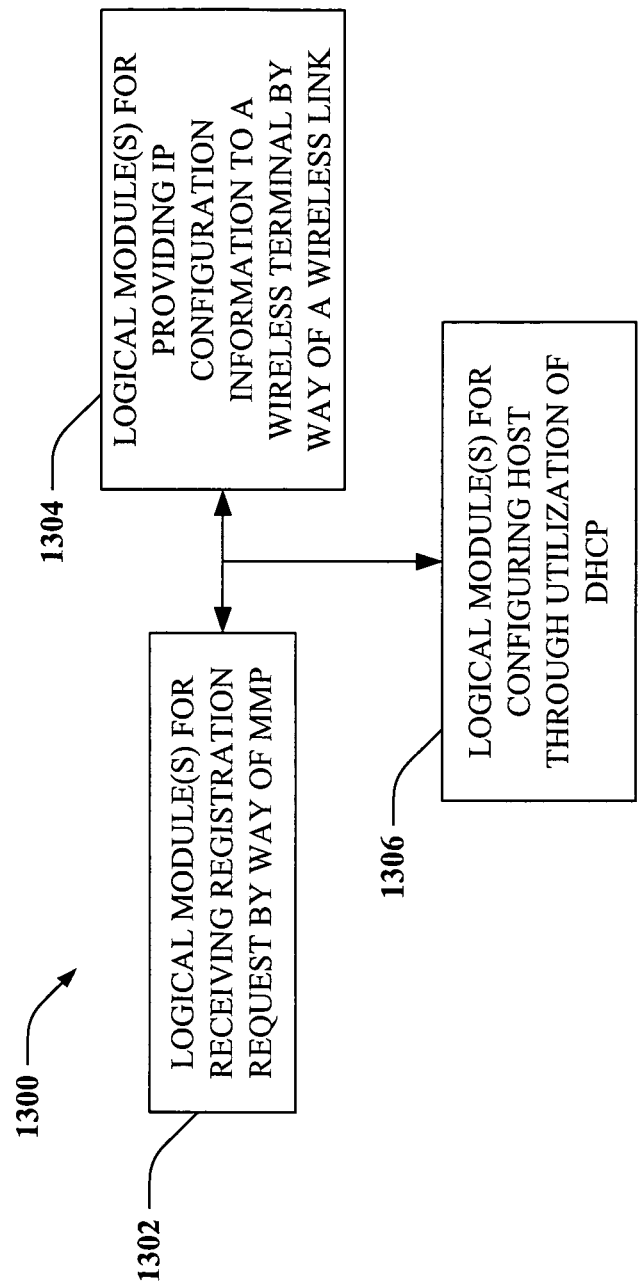
FIG. 13 is a high level block diagram of a system for configuring a host.
Figure 14:
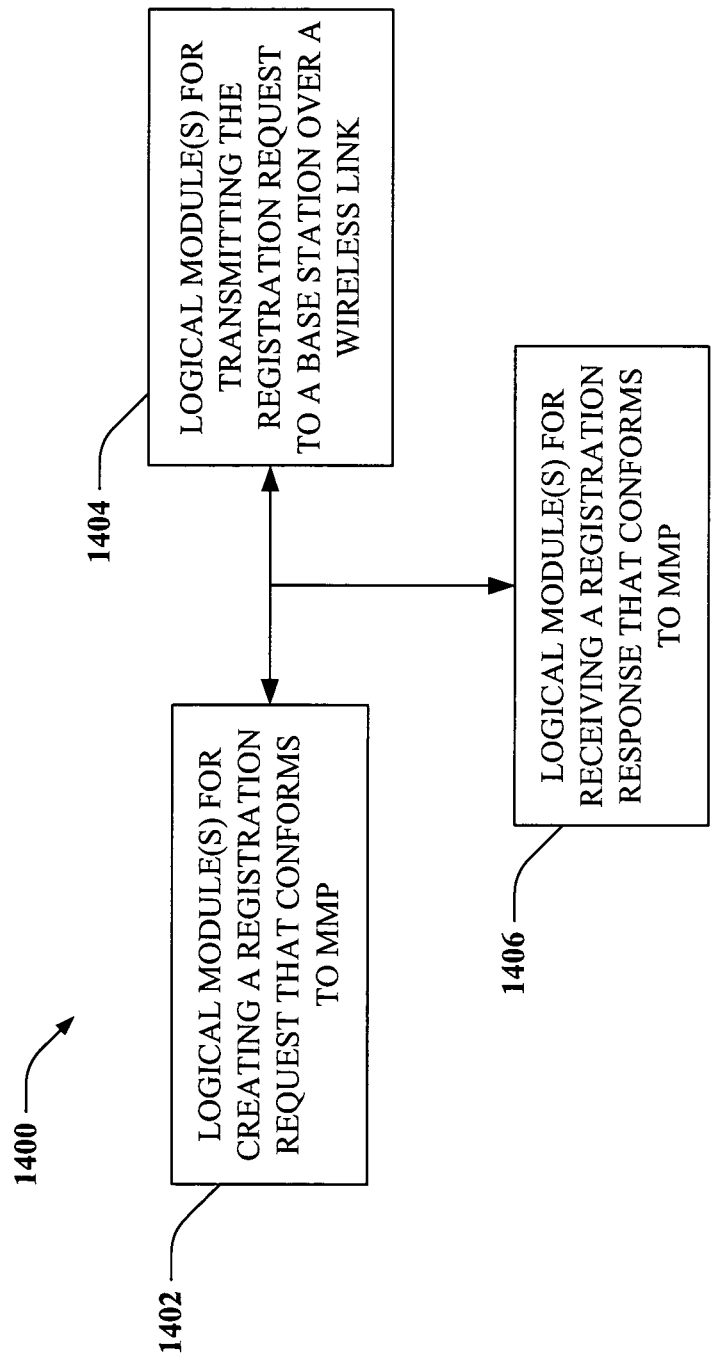
FIG. 14 is a block diagram of a system for enabling communications between a wireless terminal and a base station by way of MMP.

Turning now to FIGS. 13-14 collectively, systems are provided that relate to configuring a host. The systems are represented as a series of interrelated functional blocks, which can represent functions implemented by a processor, software, hardware, firmware, or any suitable combination thereof. Referring specifically to FIG. 13, a system 1300 that facilitates configuration of a host through utilization of MMP is illustrated. System 1300 includes logical module(s) for receiving a registration request by way of MMP 1302, wherein such module(s) 1302 can include an antenna, a port, cabling, memory, or any other suitable hardware, software, firmware, and/or combination thereof. System 1300 can additionally include logical module(s) for providing IP configuration information to a wireless terminal by way of a wireless link (e.g., over MMP) 1304. Again, such module(s) 1304 can include an antenna, a port, cabling, memory, a processor, etc. System 1300 can also include logical module(s) for configuring a host through utilization of DHCP 1306. Such module(s) 1306 can include a transmitter chain, memory that retains instructions for sending/receiving DHCP messages, and the like. As an example, system 1300 can be retained within a base station.

With reference to FIG. 14, a system 1400 that facilitates configuring a host device is illustrated. System 1400 includes logical module(s) for creating a registration request that conforms to MMP, wherein the module(s) 1402 can include a processor, memory, software, hardware, firmware, etc. System 1400 can also include logical module(s) for transmitting the registration request to a base station over a wireless link 1404, wherein such module(s) 1404 can comprise a transmitter chain, an antenna, a processor, and the like. Moreover, system 1400 can include means for receiving a registration response that conforms to MMP 1406, wherein the module(s) 1406 can again include an antenna, memory, a processor, a port, and/or any other suitable hardware and/or software. For example, a wireless terminal can include system 1400.

Figure 15:
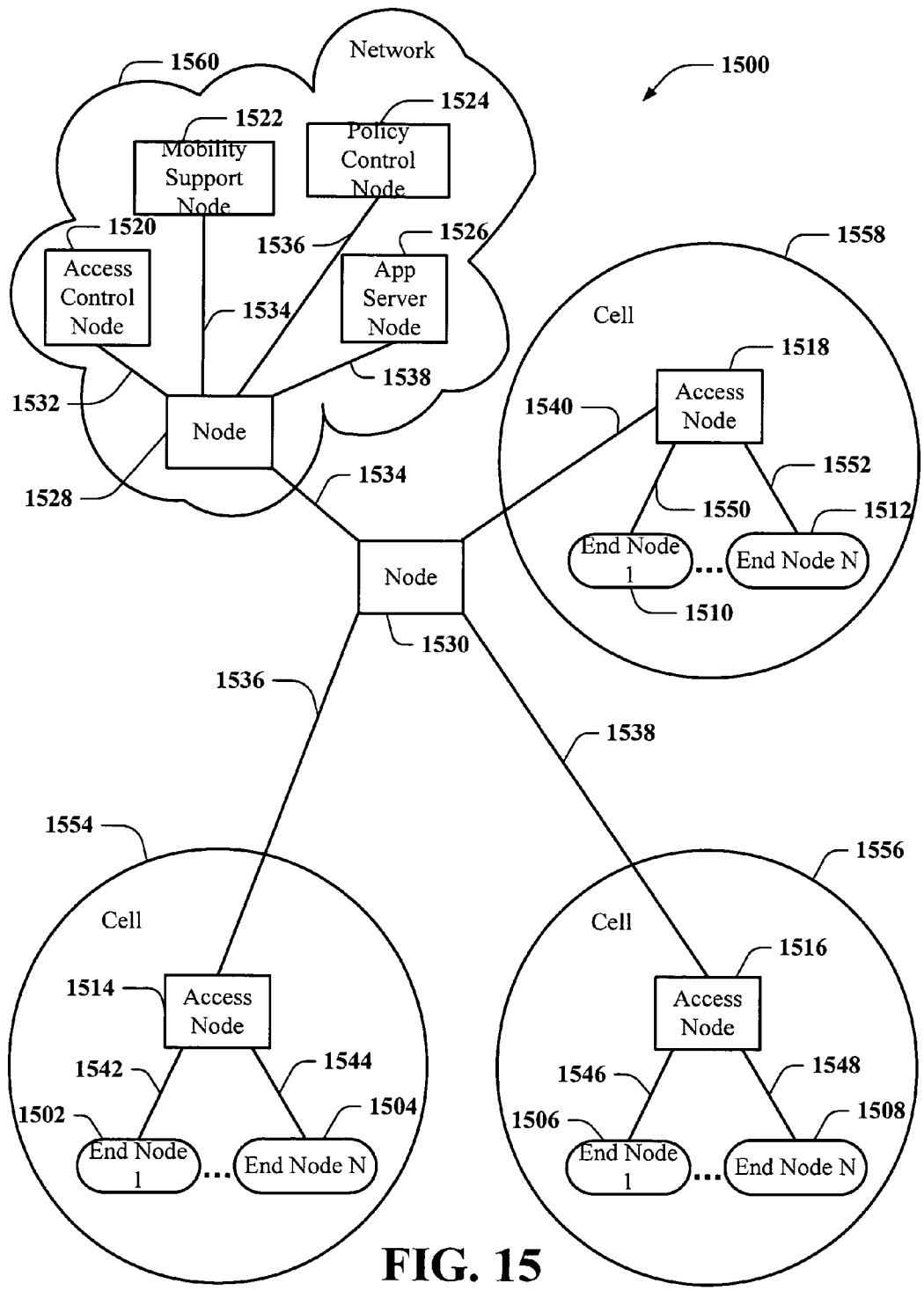
FIG. 15 illustrates an example communications system.

To provide additional context for one or more embodiments described herein, FIG. 15 is provided to illustrate an example communication system 1500 that comprises a plurality of nodes interconnected by communications links. The system 1500 may use Orthogonal Frequency Division Multiplexing (OFDM) signals to communicate information over wireless links. However, other types of signals, e.g., Code Division Multiple Access (CDMA) signals or Time Division Multiple Access (TDMA) signals, are also contemplated (together with signals utilized in land-based networks). Nodes in the communication system 1500 exchange information using signals, e.g., messages, based on communication protocols, e.g., the Internet Protocol (IP). The communications links of the system 1500 may be implemented, for example, using wires, fiber optic cables, and/or wireless communications techniques. The system 1500 includes a plurality of end nodes 1502-1512, which access the communication system 1500 by way of a plurality of access nodes 1514-1518. End nodes 1502-1512 may be, e.g., wireless communication devices or terminals, and the access nodes 1514-1518 may be, e.g., wireless access routers or base stations. Communication system 1500 also includes a number of other nodes 1520-1530 that are used to provide interconnectivity or to provide specific services or functions.

Communications system 1500 depicts a network 1560 that includes access control node 1520, mobility support node 1522, policy control node 1524, and application server node 1526, all of which are connected to an intermediate network node 1528 by a corresponding network link 1532-1538, respectively. In some embodiments, the access control node, e.g., a Remote Authentication Dial In User Service (RADIUS) or Diameter server, supports authentication, authorization, and/or accounting of end nodes and/or services associated with end nodes. In some embodiments, mobility support node 1522, e.g., a Mobile IP home agent and/or context transfer server, supports mobility, e.g., handoff, of end nodes between access nodes, e.g., by way of redirection of traffic to/from end nodes and/or transfer of state associated with end nodes between access nodes. In some embodiments, policy control node 1524, e.g., a policy server or Policy Decision Point (PDP), supports policy authorization for services or application layer sessions. In some embodiments, application server node 1526, e.g., a Session Initiation Protocol server, streaming media server, or other application layer server, supports session signaling for services available to end nodes and/or provides services or content available to end nodes.

Intermediate network node 1528 in network 1560 provides interconnectivity to network nodes that are external from the perspective of network 1560 by way of network link 1534. Network link 1534 is connected to intermediate network node 1530, which provides further connectivity to access nodes 1514, 1516, and 1518 by way of network links 1536-1540, respectively. Each access node 1514-1518 is depicted as providing connectivity to end nodes 1502-1512, respectively, by way of corresponding access links 1542-1552, respectively. In communication system 1500, each access node 1514-1518 is depicted as using wireless technology, e.g., wireless access links, to provide access. Wired technology may also be utilized, however, in connection with provision of access. A radio coverage area, e.g., communications cells 1554-1558 of each access node 1514-1518, is illustrated as a circle surrounding the corresponding access node.

Communication system 1500 can be used as a basis for the description of various embodiments described herein. Alternative embodiments include various network topologies, where a number and type of nodes (including network nodes, access nodes, end nodes, as well as various control, support, and server nodes), a number and type of links, and interconnectivity between various nodes may differ from that of communication system 1500. Additionally, some of the functional entities depicted in communication system 1500 may be omitted or combined. Location or placement of these functional entities may be varied.

Figure 16:
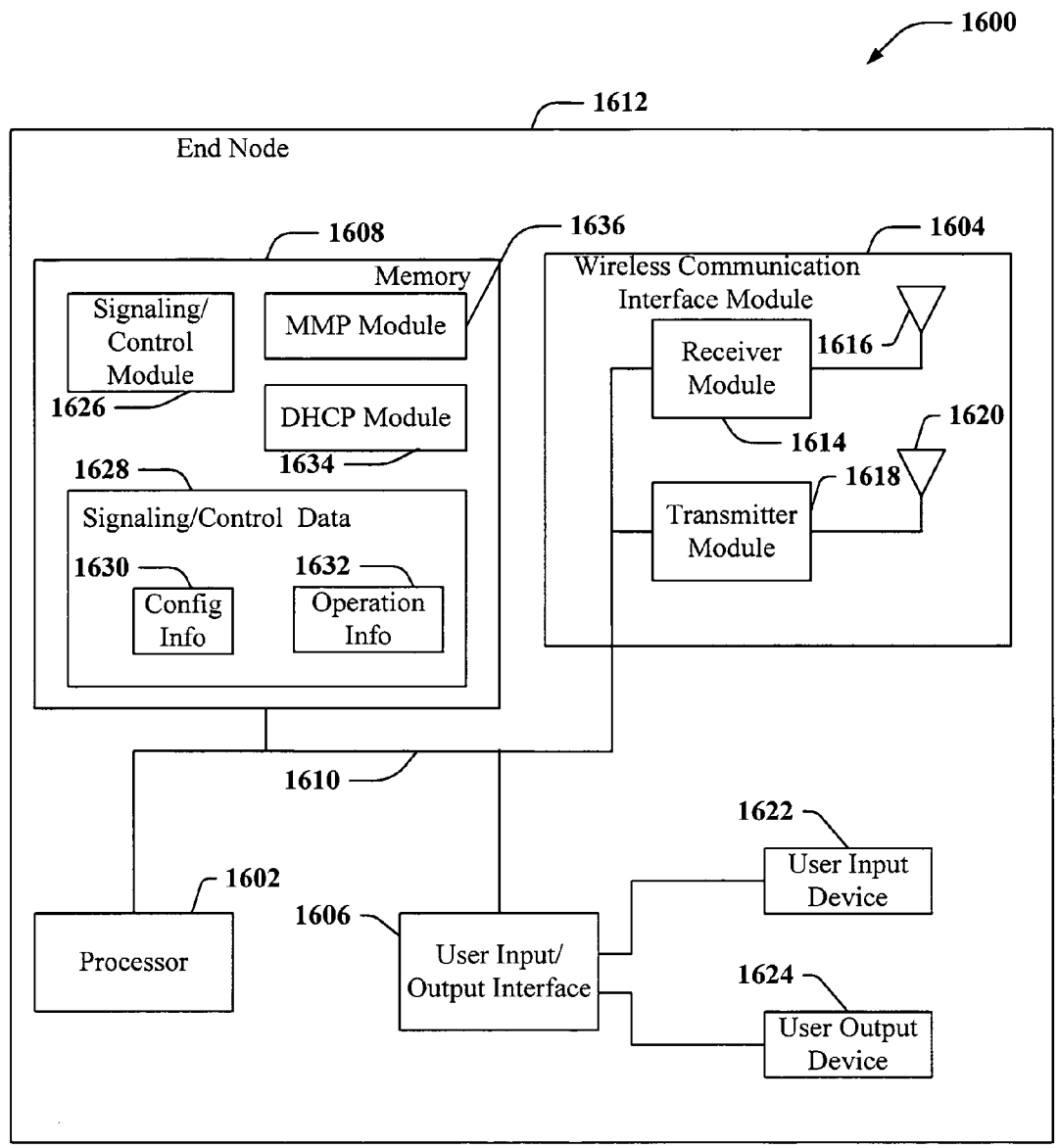
FIG. 16 illustrates an example end node.

FIG. 16 illustrates an exemplary end node 1600 (e.g., a mobile node) associated with various aspects. End node 1600 can be considered as a wireless terminal, a host device, and/or a wireless terminal integrated with a host device. For instance, memory, processor(s), and module(s) described herein can be distributed between a host device and a wireless terminal, shared by the hose device and the wireless terminal, etc. End node 1600 may be an apparatus that may be used as any one of the end nodes 1502-1512 depicted in FIG. 15. As depicted, end node 1600 includes a processor 1602, a wireless communication interface 1604, a user input/output interface 1606 and memory 1608 coupled together by a bus 1610. Accordingly, various components of end node 1600 can exchange information, signals and data via bus 1610. Components 1602-1610 of end node 1600 may be located inside a housing 1612.

Wireless communication interface 1604 provides a mechanism by which the internal components of the end node 1600 can send and receive signals to/from external devices and network nodes (e.g., access nodes). Wireless communication interface 1604 includes, for example, a receiver module 1614 with a corresponding receiving antenna 1616 and a transmitter module 1618 with a corresponding transmitting antenna 1620 used for coupling end node 1600 to other network nodes (e.g., by way of wireless communications channels).

End node 1600 also includes a user input device 1622 (e.g., keypad) and a user output device 1624 (e.g., display), which are coupled to bus 1610 by way of user input/output interface 1606. Thus, user input device 1622 and user output device 1624 can exchange information, signals and data with other components of end node 1600 through user input/output interface 1606 and bus 1610. User input/output interface 1606 and associated devices (e.g., user input device 1622, user output device 1624) provide a mechanism by which a user can operate end node 1600 to accomplish various tasks. In particular, user input device 1622 and user output device 1624 provide functionality that allows a user to control end node 1600 and applications (e.g., modules, programs, routines, functions, etc.) that execute in memory 1608 of end node 1600.

Processor 1602 may be under control of various modules (e.g., routines) included in memory 1608 and may control operation of end node 1600 to perform various signaling and processing as described herein. The modules included in memory 1608 can be executed on startup or as called by other modules. Modules may exchange data, information, and signals when executed. Modules may also share data and information when executed. Memory 1608 of end node 1600 may include a signaling/control module 1626 and signaling/control data 1628.

Signaling/control module 1626 controls processing relating to receiving and sending signals (e.g., messages) for management of state information storage, retrieval, and processing. Signaling/control data 1628 includes state information such as, for instance, parameters, status, and/or other information relating to operation of the end node. In particular, signaling/control data 1628 may include configuration information 1630 (e.g., end node identification information) and operational information 1632 (e.g., information about current processing state, status of pending responses, etc.). Signaling/control module 1626 may access and/or modify signaling/control data 1628 (e.g., update configuration information 1639 and/or operational information 1632).

Memory 1608 can also include a DHCP module 1634 and/or an MMP module 1636. For instance, if end node 1600 is a wireless terminal, a host device, and/or a wireless terminal integrated with a host device, DHCP module 1634 can be utilized to enable messages to be transmitted/received that conform to DHCP. For instance, DHCP module can enable a host device to receive configuration information from a wireless terminal and/or a base station by way of DHCP (e.g., a DHCP acknowledgment). Moreover, DHCP module 1634 can allow a host device to form and transmit DHCP messages, such as a DHCP discover message. Still further, if end node 1600 is a wireless terminal (or includes a wireless terminal), then DHCP module 1634 can be configured to transmit/receive DHCP messages with a host device. The MMP module 1636 enables a wireless terminal to form, receive, and analyze messages that conform to MMP if end node 1600 is a wireless terminal or includes a wireless terminal.

Figure 17:
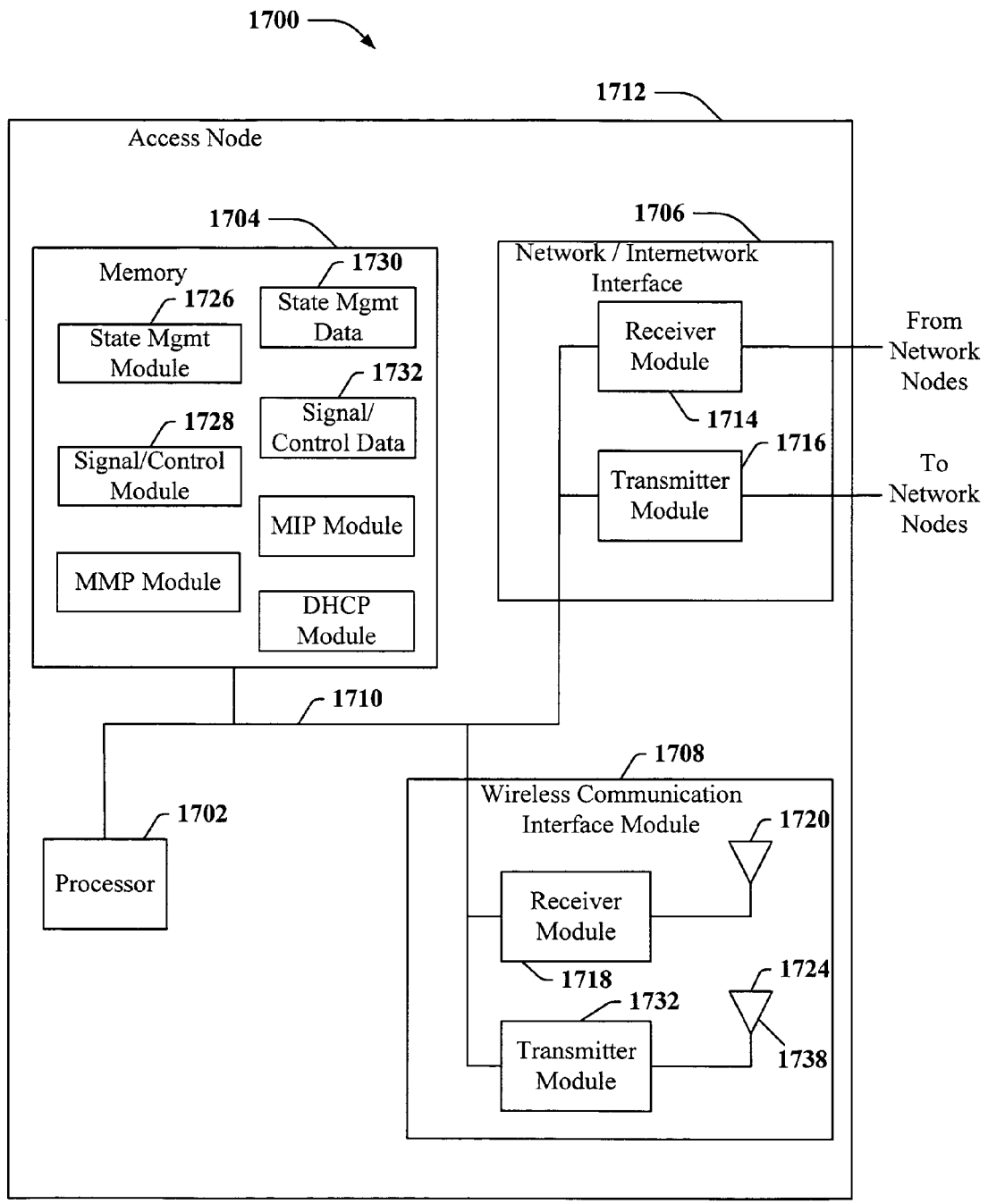
FIG. 17 illustrates an example access node.

FIG. 17 provides an illustration of an example access node 1700 implemented in accordance with various aspects described herein. Access node 1700 may be an apparatus utilized as any one of access nodes 1514-1518 depicted in FIG. 15. Access node 1700 includes a processor 1702, memory 1704, a network/internetwork interface 1706 and a wireless communication interface 1708, coupled together by a bus 1710. Accordingly, various components of access node 1700 can exchange information, signals and data by way of bus 1710. The components 1702-1710 of the access node 1700 may be located inside a housing 1712.

Network/internetwork interface 1706 provides a mechanism by which the internal components of access node 1700 can send and receive signals to/from external devices and network nodes. Network/internetwork interface 1706 includes a receiver module 1714 and a transmitter module 1716 used for coupling access node 1700 to other network nodes (e.g., through copper wires or fiber optic lines). Wireless communication interface 1708 also provides a mechanism by which the internal components of access node 1700 can send and receive signals to/from external devices and network nodes (e.g., end nodes). Wireless communication interface 1708 includes, for instance, a receiver module 1718 with a corresponding receiving antenna 1720 and a transmitter module 1722 with a corresponding transmitting antenna 1724. Wireless communication interface 1708 may be used for coupling access node 1700 to other network nodes (e.g., by way of wireless communication channels).

Processor 1702 under control of various modules (e.g., routines) included in memory 1704 controls operation of access node 1700 to perform various signaling and processing. The modules included in memory 1704 may be executed on startup or as called by other modules that may be present in memory 1704. Modules may exchange data, information, and signals when executed. Modules may also share data and information when executed. By way of example, memory 1704 of access node 1700 may include a State Management module 1726 and a Signaling/Control module 1728. Corresponding to each of these modules, memory 1704 also includes State Management data 1730 and the Signaling/Control data 1732.

State Management Module 1726 controls the processing of received signals from end nodes or other network nodes regarding state storage and retrieval. State Management Data 1730 includes, for instance, end-node related information such as the state or part of the state, or the location of the current end node state if stored in some other network node. State Management module 1726 may access and/or modify State Management data 1730.

Signaling/Control module 1728 controls the processing of signals to/from end nodes over wireless communication interface 1708 and to/from other network nodes over network/internetwork interface 1706 as necessary for other operations such as basic wireless function, network management, etc. Signaling/Control data 1732 includes, for example, end-node related data regarding wireless channel assignment for basic operation, and other network-related data such as the address of support/management servers, configuration information for basic network communications. Signaling/Control module 1728 may access and/or modify Signaling/Control data 1732.

Memory 1704 of access node 1712 can additionally include an MMP module 1734, which can include instructions for receiving and interpreting messages that correspond to MMP. Additionally, MMP module 1734 may enable access node 1712 to interpret a message in a different format (e.g., MIP) and form an MMP message based upon content of the interpreted message. Memory 1704 can also include an MIP module 1736 that enables access node 1712 to receive and transmit messages to/from a home agent, wherein the messages conform to MIP. Additionally, MIP module 1736 can enable access node 1700 to populate an MIP message with content from messages of different formats (e.g., MMP). Memory 1704 can also include a DHCP module 1738, which allows access node 1700 to act as a DHCP server. For instance, DHCP module 1738 can be employed in connection with providing a host device with configuration information by way of DHCP.

What has been described above includes examples of one or more embodiments. It is, of course, not possible to describe every conceivable combination of modules or methodologies for purposes of describing the aforementioned embodiments, but one of ordinary skill in the art may recognize that many further combinations and permutations of various embodiments are possible. Accordingly, the described embodiments are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for configuring a host device, comprising:
  receiving, at a base station, a request with respect to registering a wireless terminal, said request being received over an air link;
  providing, from the base station to the wireless terminal, an indication that an IP address has been assigned to the host device, said IP address being an address assigned by a home agent to the host device; and
  operating the base station as a Dynamic Host Configuration Protocol (DHCP) server, wherein operating the base station as a DHCP server includes:
    responding to a DHCP discover message from the host device associated with the wireless terminal by providing the host device configuration information including said IP address.

2. The method of claim 1, further comprising operating the base station to perform the steps of:
  providing a Mobile IP (MIP) request for a home address for the host device to the home agent; and
  receiving a MIP signal communicating the home address.

3. The method of claim 2,
  wherein said host device is coupled to said wireless terminal by a wireless terminal interface; and
  wherein said MIP signal communicating the home address is one of a MIPv4 signal and a MIPv6 signal.

4. The method of claim 3,
  wherein said request received by said base station is a Mobility Management Protocol (MMP) registration message which is in an MMP message format, said MMP message format being different from a Mobile IP (MIP) message format.

5. The method of claim 1, wherein the received request includes a field that identifies whether the request is an initial request, the method further comprising:
   prior to providing, from the base station to the wireless terminal an indication that an IP address has been assigned to the host device:
      operating the base station to generate a registration request message in a MIP format from a received MMP registration request message;
      sending the generated MIP registration message to the home agent; and
      receiving said IP address from the home agent.

6. The method of claim 1, wherein said request is an MMP registration request that includes both an initial registration indicator and a time stamp.

7. The method of claim 1,
   wherein said DHCP discover message is generated by said host device;
   wherein said host device hosts is one of: a personal digital assistant, a mobile telephone, or a computer; and
   wherein said host device is coupled to said wireless terminal.

8. The method of claim 1, wherein said host device and said wireless terminal are different physical devices which are coupled together by an interface.

9. A base station, comprising:
   a memory that retains instructions for:
      receiving, at the base station a request with respect to registering a wireless terminal, said request being received over an air link;
      providing, from the base station to the wireless terminal, an indication that an IP address has been assigned to the host device, said IP address being an address assigned by a home agent to a host device associated with the wireless terminal; and
      controlling the base station to operate as a Dynamic Host Configuration Protocol (DHCP) server, said controlling including controlling the base station to respond to a DHCP discover message from the host device associated with the wireless terminal by providing the host device configuration information including said IP address; and
   a processor that executes the instructions.

10. The base station of claim 9, wherein said request is an MMP registration request that includes both an initial registration indicator and a time stamp.

11. The base station of claim 9, wherein the memory comprises further instructions for:
   providing a mobile IP (MIP) request for a home address for the host device to the home agent; and
   receiving a MIP signal communicating the home address of MIP.

12. The base station of claim 9,
   wherein said DHCP discover message is generated by said host device;
   wherein said host device is one of: a personal digital assistant, a mobile telephone, or a computer; and
   wherein said host device is coupled to said wireless terminal.

13. A base station, comprising:
   means for receiving, at said base station, a registration request from a wireless terminal, said request being received over an air link;
   means for providing, from the base station to the wireless terminal, an indication that an IP address has been assigned to a host device associated with the wireless terminal, said IP address being an address assigned by a home agent to the host device; and
   means for controlling the base station to operate as a Dynamic Host Configuration Protocol (DHCP) server, said means for controlling including means for responding to a DHCP discover message from the host device associated with the wireless terminal by providing the host device configuration information including said IP address.

14. The base station of claim 13, further comprising:
   means for receiving said DHCP discover message from the host device.

15. The base station of claim 14, further comprising:
   means for providing a mobile IP (MIP) request for a home address for the host device to the home agent; and
   means for receiving a MIP signal communicating the home address.

16. The base station of claim 13,
   wherein said DHCP discover message is generated by said host device;
   wherein said host device hosts said wireless terminal and is one of: a personal digital assistant, a mobile telephone, or a computer; and
   wherein said host device is coupled to said wireless terminal.

17. A non-transitory machine-readable medium having stored thereon machine-executable instructions for:
   receiving, at a base station, a registration request from a wireless terminal, said request being received on an over the air link;
   providing, from the base station to the wireless terminal, an indication that an IP address has been assigned to the host device, said IP address being an address assigned by a home anent to the host device; and
   controlling the base station to operate as a Dynamic Host Configuration Protocol (DHCP) server, said instructions for controlling including instructions for responding to a DHCP discover message from the host device associated with the wireless terminal by providing the host device configuration information including said IP address.

18. The non-transitory machine-readable medium of claim 17, wherein said request received by said base station is a Mobility Management Protocol (MMP) registration message which is in an MMP message format, said MMP format being different form a Mobile IP (MIP) message format.

19. The non-transitory machine-readable medium of claim 17 having stored thereon further machine-executable instructions for:
   receiving said DHCP discover message from the host device.

20. The non-transitory machine-readable medium of claim 17,
   wherein said DHCP discover message is generated by said host device;
   wherein said host device hosts said wireless terminal and is one of: a personal digital assistant, a mobile telephone, or a computer; and
   wherein said host device is coupled to said wireless terminal.

21. A method of operating a wireless terminal that facilitates configuring a host device, comprising:
   creating a registration request that conforms to a Mobility Management Protocol (MMP), the registration request being generated on behalf of the host device;
   transmitting the registration request to a base station over a wireless link;

receiving an MMP registration response, the MMP registration response including host device configuration information including an IP address assigned by a home agent to said host device;

following receipt of said MMP registration response, sending a trigger signal to initiate an auto configuration process in the host device; and operating said wireless terminal as a Dynamic Host Configuration Protocol (DHCP) server, wherein operating as a DHCP server includes:

responding to a DHCP discover message from the host device by providing the host configuration information including said IP address.

22. The method of claim 21,
wherein said MMP is not Mobile IP;
wherein said host device is coupled to said wireless terminal by a wireless terminal interface, the method further comprising:
indicating within the registration request that a registration is an initial registration.

23. The method of claim 21,
wherein operating as a DHCP server includes receiving, at the wireless terminal, the DHCP discover message from the host device;
wherein responding to the DHCP discover message includes sending a DHCP offer message to the host device; and
wherein the method further comprises:
receiving a DHCP request message from the host device; and responding to the DHCP request message with a DHCP acknowledgement message.

24. The method of claim 21,
wherein said DHCP discover message is generated by said host device;
wherein said host device hosts said wireless terminal and is one of: a personal digital assistant, a mobile telephone, or a computer; and
wherein said host device is coupled to said wireless terminal.

25. The method of claim 21, wherein said trigger signal is a signal sent over a wireless terminal interface to the host device indicating that a network is available.

26. The method of claim 21, wherein said wireless terminal and said host device are different physical devices coupled together by an interface.

27. A wireless terminal, comprising:
a memory that retains instructions for:
generating a mobility management protocol (MMP) registration request message on behalf of a host device;
providing the MMP registration request message to a base station over a wireless link; and
receiving an MMP registration response message from the base station, the MMP registration response message including information for configuring the host device, said information including an IP address assigned by a home agent to said host device;
sending, following receipt of said MMP registration response, a trigger signal to initiate an auto configuration process in the host device; and
operating said wireless terminal as a Dynamic Host Configuration Protocol (DHCP) server, said instructions for operating as a DHCP server including instructions for responding to a DHCP discover message from the host by providing the host device configuration information including said IP address; and
a processor that executes the instructions.

28. The wireless terminal of claim 27, wherein the memory further includes instructions for indicating to the host device that a link is available with respect to the base station.

29. The wireless terminal of claim 27, wherein the memory further includes instructions for configuring the wireless terminal to act as a DHCP server with respect to the host device.

30. The wireless terminal of claim 27,
wherein said DHCP discover message is generated by said host device;
wherein said host device hosts said wireless terminal and is one of: a personal digital assistant, a mobile telephone, or a computer; and
wherein said host device is coupled to said wireless terminal.

31. A wireless terminal, comprising:
a memory that retains instructions for:
generating Mobility Management Protocol (MMP) registration request message on behalf of a host device;
providing the MMP registration request message to a base station over a wireless link; and
receiving an MMP registration response message from the base station, the response message indicating that an IP address is available with respect to the host device;
providing a sequence number within the MMP registration request;
indicating whether a registration associated with the MMP registration request is an initial registration; and
providing a timestamp within the MMP registration request; and
a processor that executes the instructions.

32. A wireless terminal, comprising:
means for creating a registration request that conforms to a Mobility Management Protocol (MMP), the registration request being generated on behalf of a host device;
means for transmitting the registration request to a base station over a wireless link; and
means for receiving a registration response that conforms to MMP, the registration response including host device configuration information, said host device configuration information including an IP address assigned by a home agent to said host device;
means for sending, following receipt of said MMP registration response, a trigger signal to initiate an auto configuration process in the host device; and
means for controlling said wireless terminal to operate as a Dynamic Host Configuration Protocol (DHCP) server, said controlling including responding to a DHCP discover message from the host device by providing the host device configuration information including said IP address.

33. The wireless terminal of claim 32,
wherein said DHCP discover message is generated by said host device;
wherein said host device hosts said wireless terminal and is one of: a personal digital assistant, a mobile telephone, or a computer; and
wherein said host device is coupled to said wireless terminal.

34. A non-transitory machine-readable medium having stored thereon machine-executable instructions for controlling a wireless terminal, non-transitory machine-readable medium including instructions for:

generating a mobility management protocol (MMP) registration request message on behalf of a host device;
providing the MMP registration request message to a base station over a wireless link;
receiving an MMP registration response message from the base station, the response message including host device configuration information including an IP address assigned by a home agent to said host device;
sending, following receipt of said MMP registration response, a trigger signal to initiate an auto configuration process the host device; and
operating said wireless terminal as a Dynamic Host Configuration Protocol (DHCP) server, said instructions for operating as a DHCP server including instructions for responding to a DHCP discover message from the host device by providing the host device configuration information including said IP address.

35. The non-transitory machine-readable medium of claim 34 having stored thereon further machine-executable instructions for indicating to the host device that a wireless link is available with respect to the base station.

36. The non-transitory machine-readable medium of claim 34 having stored thereon further machine-executable instructions for:
receiving, at the wireless terminal a DHCP discover message from the host device;
wherein instructions for responding to the DHCP discover message includes instructions for sending a DHCP offer message to the host device;
receiving a DHCP request message from the host device; and
responding to the DHCP request message with a DHCP acknowledgement message.

37. The non-transitory machine-readable medium of claim 34,
wherein said DHCP discover message is generated by said host device;
wherein said host device hosts said wireless terminal and is one of: a personal digital assistant, a mobile telephone, or a computer; and
wherein said host device is coupled to said wireless terminal.

* * * * *